United States Patent
Miwa

Patent Number: 5,144,771
Date of Patent: Sep. 8, 1992

[54] LIQUID SUPPLY SYSTEM OF AN ULTRASONIC MACHINE

[75] Inventor: Yuji Miwa, Chita, Japan

[73] Assignee: Brother Kogyo Kabushiki Kaisha, Nagoya, Japan

[21] Appl. No.: 646,204

[22] Filed: Jan. 28, 1991

[30] Foreign Application Priority Data

Feb. 6, 1990 [JP] Japan .................... 2-26777

[51] Int. Cl.$^5$ .............................................. B24B 55/02
[52] U.S. Cl. ..................... 51/59 SS; 51/267; 51/356
[58] Field of Search ............ 51/59 SS, 263, 292, 51/267, 356; 173/57; 175/55, 56

[56] References Cited

U.S. PATENT DOCUMENTS

| | | | |
|---|---|---|---|
| 3,557,494 | 1/1971 | Bullen | 51/59 SS |
| 3,561,462 | 2/1971 | Jugler | 51/59 SS |
| 3,608,648 | 9/1971 | Dibble, Jr. | 51/59 SS |
| 4,828,052 | 5/1989 | Duran | 51/59 SS |

FOREIGN PATENT DOCUMENTS 0076261  4/1986  Japan ................. 51/59 SS
64-56941  4/1989  Japan .

*Primary Examiner*—Robert A. Rose
*Attorney, Agent, or Firm*—Oliff & Berridge

[57] ABSTRACT

In an ultrasonic machine including an ultrasonic horn connected with a piezoelectric transducer and a machining liquid passage, a tool mounted on the ultrasonic horn and provided with a bore inside thereof that communicates with the machining liquid passage, the ultrasonic machine comprising: a fixed side member fixed to the machining body and having a machining liquid supply passage, an annular groove; a horn communication passage communicating with the machining liquid passage; a first thin portion provided near the opening; a pressure chamber drop means provided near the first thin portion; a drain provided in the fixed side member and communicating with the pressure chamber drop means; a second thin portion provided near the pressure chamber drop means; and an air supply passage provided in the fixed side member and communicating with the second thin portion. In the ultrasonic machine, the ultrasonic horn and the fixed side member remains separated to ensure a high-speed rotation and machining liquid does not leak spattering around the tip of the tool.

20 Claims, 3 Drawing Sheets

LIQUID SUPPLY SYSTEM OF AN ULTRASONIC MACHINE

BACKGROUND OF THE INVENTION

The present invention relates to an ultrasonic machine that supplies machining liquid to a tool mounted on an ultrasonic horn.

Conventionally, an ultrasonic machine rotates and ultrasonically vibrates a tool simultaneously to execute a boring operation. Machining liquid, ejected from the end of the tool, removes chips and cools the tool tip. The machining liquid is supplied to the tip of the tool through a bore formed in the tool and a liquid passage formed in the ultrasonic horn, which is connected to the bore.

One such related-art supply system includes a method of sealing the joint between a fixed side member that supplies machining liquid to a machining liquid passage of an ultrasonic horn from the outside and an oil passage by means of a small clearance. The oil passage is formed in a small space between a machining liquid supply unit for supplying the machining liquid from the outside and the ultrasonic horn. In accordance with this method, the machining liquid supply unit is not in contact with the ultrasonic horn so that ultrasonic vibration and high-speed rotation of the tool are not hampered by the friction occurring therebetween.

However, since the seal between the fixed side member and the ultrasonic horn is merely a clearance, the machining liquid sometimes leaks out therefrom. When high pressure is applied to the machining liquid, the leaking liquid spatters around the tool, obstructing a clear view of the tip of the tool.

Wherefore, an object of the present invention made to overcome the above-identified problem is to provide an ultrasonic machine in which machining liquid does not leak out between the machining liquid supply unit and the ultrasonic horn.

Other objects and benefits of the invention will become apparent from the detailed description which follows hereinafter when taken in conjunction with the drawing figures which accompany it.

SUMMARY

In an ultrasonic machine of the present invention made to attain the above object including an ultrasonic horn connected with a piezoelectric transducer and rotatably supported by a machine body, the ultrasonic horn having a cylindrical portion formed on the out side thereof and a machining liquid passage for supplying machining liquid formed inside thereof, a tool mounted on the ultrasonic horn and provided with a bore inside thereof that communicates with the machining liquid passage, the ultrasonic machine comprises: a fixed side member fixed to the machining body and having a machining liquid supply passage that receives a supply of machining liquid from a machining liquid supply means and an inner surface that fits the outer surface of the cylindrical portion; an annular groove formed in the inner surface of the fixed side member, the annular groove communicating with the machining liquid passage; a horn communication passage provided in the ultrasonic horn and having an opening in the outer surface of the cylindrical portion of the ultrasonic horn in such a position as to be opposed to the annular groove, the horn communication passage communicating with the machining liquid passage; a first thin portion provided near the opening formed by the outer surface of the cylindrical portion and the inner surface of the fixed side member; a pressure drop chamber provided near the first thin portion and formed between the outer surface of the cylindrical portion and the inner surface of the fixed side member; a drain provided in the fixed side member and communicating with the pressure drop chamber; a second thin portion provided near the pressure drop chamber and formed by the outer surface of the cylindrical portion and the inner surface of the fixed side member; and an air supply passage provided in the fixed side member and communicating with the second thin portion.

In the operation of the ultrasonic machine thus constructed, the machining liquid supply means supplies machining liquid to the annular groove formed in the inner surface of the fixed side member via the machining liquid supply passage of the fixed side member. The machining liquid supplied to the annular groove is sealed therein by the first thin portion formed by the outer surface of the cylindrical portion and the inner surface of the fixed side member. The machining liquid in the annular groove flows into the machining liquid passage formed in the ultrasonic horn via the opening formed in the outer surface of the ultrasonic horn and opposed to the annular groove. Subsequently, the machining liquid goes through a bore formed in the tool and gushes out of the tool.

Part of the machining liquid supplied to the annular groove leaks into the pressure drop chamber through the first thin portion. Upon leaking into the pressure drop chamber, the machining liquid is quickly decompressed. The machine liquid in the pressure drop chamber is sealed therein by the second thin portion and discharged from the fixed side member through the drain. Air is supplied to the second thin portion from the air supply passage, which prevents the machining liquid in the pressure drop chamber from entering the second thin portion.

Thus, in the above ultrasonic machine, the fixed side member is not in contact with the ultrasonic horn. Furthermore, machining liquid is supplied to the bore of the tool without leaking into t tool through the abutment of the ultrasonic horn and the fixed side member.

DESCRIPTION OF THE PREFERRED EMBODIMENT

Figure 2:
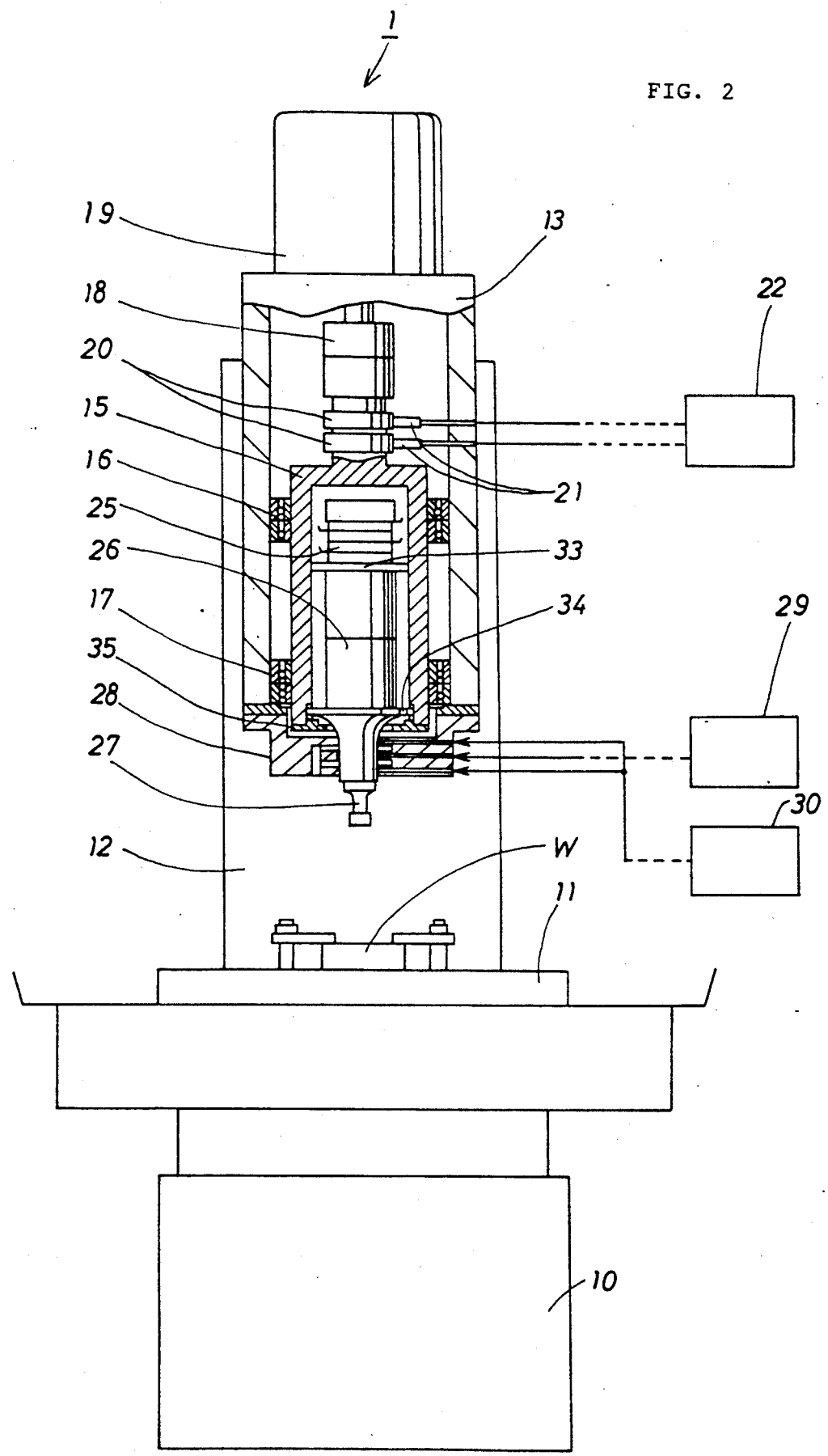
FIG. 2 is a front view of the ultrasonic machine of the present invention.

Referring first to FIG. 2, an ultrasonic machine of an embodiment will be explained in detail hereinafter. A work stock 11 that is movable on a horizontal plane is provided above a bed 10. Erected upright in the rear of the work stock 11 is a column 12. A headstock 13, which is vertically movable, is provided on the column 12. A cylindrical main shaft 15 is provided in the headstock 13 and is rotatably supported in bearings 16 and 17. The main shaft 15 is also connected with the output shaft of a main shaft motor 19 by means of a coupling 18. Two slip rings 20 are mounted on the upper portion of the main shaft 15 for applying voltage from an ultrasonic vibration generator 22 to a piezoelectric transducer 25 provided in the main shaft 15 via brushes 21. An ultrasonic horn 26 connected with the piezoelectric transducer 25 is installed in the cylindrically shaped main shaft 15 and rotates together with the main shaft 15. A tool 27 is attached to the end of the ultrasonic horn 26 for polishing operations. Provided on the bottom surface of the headstock 13 is a machining liquid supply adaptor 28 for supplying machining liquid from a machining liquid supply unit 29 into the tool 27. As explained below, compressed air is supplied to the machining liquid supply adaptor 28 from an air supply unit 30.

Figure 1:
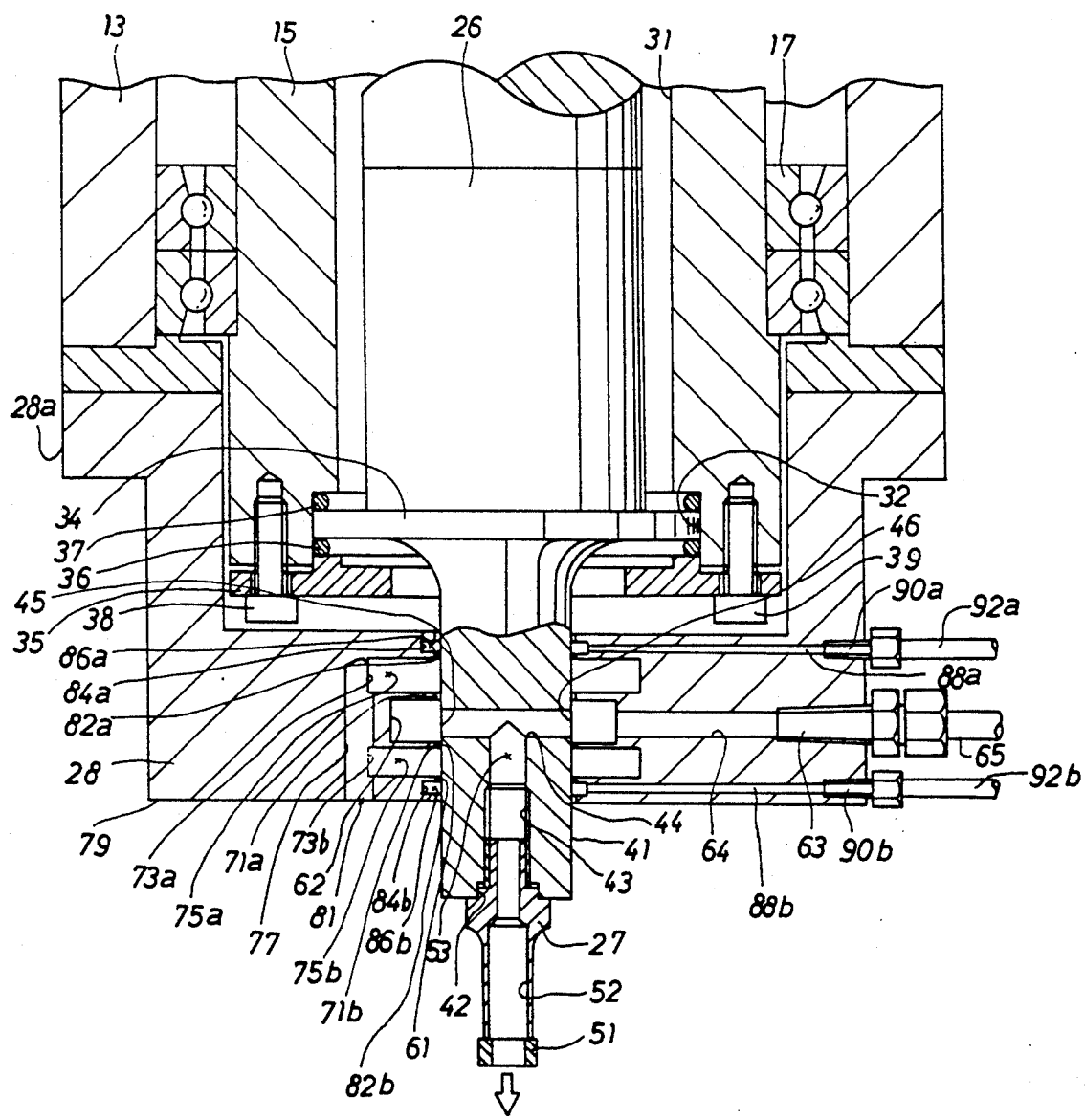
FIG. 1 is an enlarged detailed fragmentary sectional view of a part of the ultrasonic machine of an embodiment of the present invention.

As shown in FIG. 1, the main shaft 15 which is formed substantially cylindrical is provided with a concentric inner bore 31 penetrating the bottom thereof. The bore 31 is enlarged near the bottom so as to form a recess 32. On the other hand, a substantially cylindrical ultrasonic horn 26 is provided with top and bottom support flanges 33 and 34, respectively. While the piezoelectric transducer 25 composed of electrostrictive elements is fixed on the top of the ultrasonic horn 26, a detachable tool 27 is fixed on the bottom thereof. The lower portion of the ultrasonic horn 26 is tapered in order to amplify ultrasonic vibration. The top and bottom support flanges 33 and 34 are formed at upper and lower two nodes of the axial-direction ultrasonic vibration caused by the piezoelectric transducer 25 when the tool 27 is attached to the ultrasonic horn 26 and vibrated.

The ultrasonic horn 26 having the piezoelectric transducer 25 attached thereto is fitted in the main shaft 15 so that the periphery of the upper support flange 33 is in slidable contact with the inner surface 31 of the main shaft 15 and the lower support flange 34 is slidably engaged with the recess 32. Then, an annular flange fixing plate 35 presses upward and fixes the lower support flange 34 via two steel rings 36 and 37. The flange fixing plate 35 is fixed to the bottom surface of the main shaft 15 by bolts 38 and 39.

The ultrasonic horn 26 narrows down in the lower portion to forms a cylindrical member 41 having a smaller diameter than the upper portion thereof. Provided in the bottom surface of the cylindrical member 41 are an engage bore 42 and a tapped bore 43 formed in the axial direction thereof for screwing in the tool 27. A plurality of bores 44 are formed in the cylindrical member 41 in the direction of radius thereof, which makes a plurality of openings 45 and 46 on the same circle on the outside surface of the cylindrical member 41.

The tool 27, which performs coring, is provided with an annular diamond grindstone 51 on the end thereof and has a bore 52 formed therein for ejecting machining liquid. The tapped bore 43 and the bores 44 compose a first machining liquid passage 53 which connects the openings 45 and 46 with the bore 52 of the tool 27. The machining liquid supply adaptor 28 has a cylindrical shape and is fitted on the headstock 13 by an adaptor flange 28a.

An insert bore 61 is provided at the center of the bottom of the machining liquid supply adaptor 28. The cylindrical portion 41 of the ultrasonic horn 26 penetrates the insert bore 61 with a narrow clearance without touching thereof. An annular groove 62 is formed in the inner surface of the insert bore 61 while a second machining liquid passage 64 is formed to connect the annular groove 62 with a machining liquid supply port 63. The annular groove 62 is opposed to the openings 45 and 46 of the ultrasonic horn 26. The machining liquid supply port 63 is connected with the machining liquid supply unit 29 by a pipe 65 through which high pressured machining liquid measuring no less than 10 kg/cm$^2$ is supplied.

Interposing the annular groove 62 of the machining liquid supply adaptor 28 are first thin portions 71a and 71b where the insert bore 61 is opposed to the cylindrical member 41 with a narrow clearance.

Provided next to the first thin portions 71a and 71b are second annular grooves 73a and 73b, respectively, which constitute pressure drop chambers 75a and 75b. The pressure drop chambers 75a and 75b communicate with a drain 77 formed in the machining liquid supply adaptor 28. The drain 77 communicates with a discharge opening 81 formed in the bottom surface 79 of the machining liquid supply adaptor 28. A machining liquid collector (not shown) is provided in such a position that the discharge opening 81 is opposed thereto. The machining liquid collector collects and transfers machining liquid discharged from the discharge opening 81 back to the machining liquid supply unit 29.

Second thin portions 82a and 82b are formed on the other sides of the pressure drop chambers 75a and 75b opposite to the first thin portions 71a and 71b, respectively. The insert bore 61 is opposed to the cylindrical member 41 with a narrow clearance across the second thin portions 82a and 82b. Furthermore, second annular grooves 84a and 84b are formed next to the second thin portions 82a and 82b, which constitute air supply passages 86a and 86b for supplying pressured air to the second thin portions 82a and 82b. The air supply passages 86a and 86b communicates with air supply bores 88a and 88b formed in the machining liquid supply adaptor 28. The air supply bores 88a and 88b are provided with air supply ports 90a and 90b, which are connected with the air supply unit 30 by air pipes 92a and 92b, through which compressed air is supplied.

In operation, high pressured machining liquid supplied from the machining liquid unit 29 flows through the machining liquid supply port 63 of the machining liquid supply adaptor 28 and the second machining liquid passage 64 and fills the annular groove 62 sealed by the first thin portions 71a and 71b. The high pressured machining liquid filling the annular groove 62 flows through the first machining liquid passage 53 composed of the openings 45 and 46, the bores 44, and the tapped bore 43, reaches the bore 52, and is ejected to a machining point. A very small amount of the high pressured machining liquid leaks into the pressure drop chambers 75a and 75b past the first thin portions 71a and 71b. The cross-sectional areas of the pressure drop chambers 75a and 75b are sufficiently larger than those of the first thin portions 71a and 71b. Accordingly, upon entering and accumulating in the pressure drop chambers 75a and 75b, the machining liquid is rapidly decompressed. The machining liquid stored under approximately atmospheric pressure in the pressure drop chambers 75a and 75b is momentarily discharged from the drain 77 without filling up the pressure drop chambers 75a and 75b.

The compressed air supplied to the air supply passages 86a and 86b raises the pressure of the air supply passages 86a and 86b, and the second thin portions 82a and 82b up to approximately the same as the compressed air. Therefore, the second thin portions 82a and 82b function as air seals, preventing the machining liquid under approximately atmospheric pressure in the pressure drop chambers 75a and 75b from leaking past the second thin portions 82a and 82b. All the machining liquid leaking past the first thin portions 71a and 71b into the pressure drop chambers 75a and 75b is discharged from the drain 77.

In order to discharge all the machining liquid from the drain 77, the pressures of the pressure drop chambers 75a and 75b must be lower than those adjacent the second thin portions 82a and 82b. For that purpose, the drain 77 must be properly designed so that the machining liquid does not fill the pressure drop chambers 75a and 75b.

Figure 3:
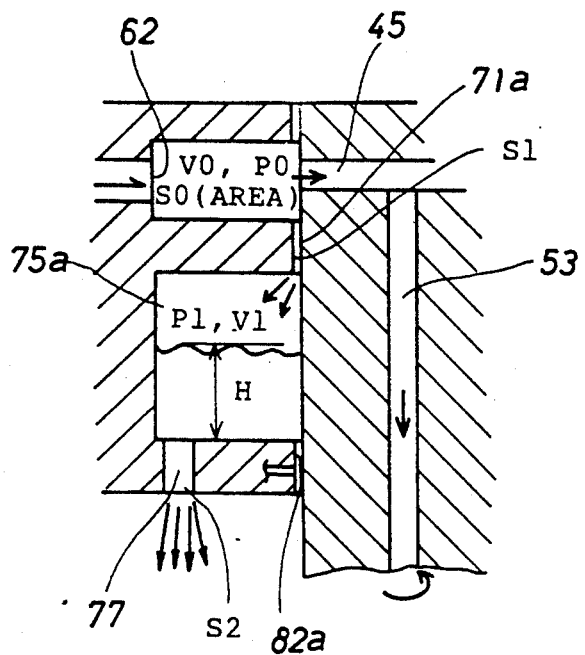
FIG. 3 is an explanatory view of a machining liquid supply system of the present invention.

Turning now to FIG. 3, an exemplary calculation of the diameter Dd of the opening 81 of the drain 77 for such preferred operation is explained hereinafter. In the example of FIG. 3, the first thin portion 71a, the pressure drop chamber 75a, and the second thin portion 82a are included.

The relation between the pressure and the flow velocity upstream of the first thin portion 71 and the same downstream of the first thin portion 71a is expressed in the equation given below based Bernoulli's theorem. "Upstream" hereinafter refers to upstream of the first thin portion 71a while "downstream" refers to downstream of the first thin portion 71a.

$$V0^2/2g + Z0 + P0/r = V1^2/2g + Z1 + P1/r + h01 \quad (1)$$

In equation (1), P0, V0, and S0 represent the pressure, the flow velocity, and the cross-sectional area, respectively, of the machining liquid in the annular groove 62, which is on the supply side of the machining liquid. S1 is the cross-sectional area of the first thin portion 71a. (P1≈0) and V1 represent the pressure and the flow velocity of the machining liquid that has leaked out past the first thin portion 71a. h01 is the loss of head.

Considering the massive loss occurring in this case, the head loss is expressed as follows.

$$h01 = \xi(V1 - V1)^2/2g$$

If the ratio of the cross-sectional area of the upstream machining liquid to that of the downstream machining liquid is large, the head loss h01 is expressed as follows.

$$h01 = V1^2/2g$$

If Z0=Z1 and P1=0, the following equation (2) is obtained from equation (1).

$$V0^2/2g + P0/r = V1^2/2g + V1^2/2g \quad (2)$$

Furthermore, S0V0=S1V1 gives V0/V1=S1/S0≈0. So, V0≈0.

Therefore, equation (2) equals $P0/r = V1^2/g$

Based on the above, if P0 is determined, V1 is determined. Also, if S1 is determined, a drain amount Q1, the amount of the machining liquid that must be drained from the drain 77, is determined.

Figure 4:
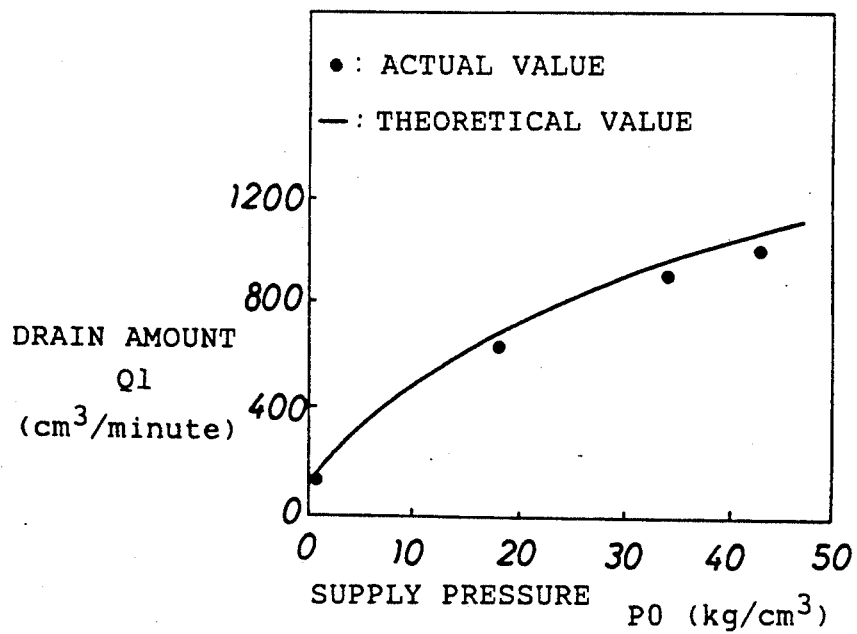
FIG. 4 is a graph showing the relation between the drain amount and the supply pressure of the machining liquid of the present embodiment.

FIG. 4 shows the respective theoretical and actual drain amounts Q1 when the cross-sectional area S1 of the first thin portion 71a is 0.0028 cm² and the supply pressure P0 of the machining liquid is 1, 18, 34, and 43 kg/cm².

To facilitate discharge of the machining liquid from the drain 77, the capacity of the drain 77 must be sufficiently large so that the machining liquid leaking past the first thin portion 71a into the pressure drop chamber 75a where the machining liquid is momentarily stored does not fill up the pressure drop chamber 75a.

In FIG. 3, the water level H of the machining liquid in the pressure drop chamber 75a must be sufficiently high without filling thereof.

The velocity Vd of the machining liquid discharged from the drain 77 is expressed by the following equation based on Tricelli's theorem.

$$Vd = \geq 2gH$$

Therefore, $Qd = S2 \cdot Vd = \sqrt{2gH} \cdot S2$ gives $S2 = Qd/\approx 2gH$

Qd corresponds to Q1 mentioned above. If the other variables are determined, the area of the discharge opening 81 of the drain 77 can be arrived at. For instance, if Qd = 1,100 cm³/minute and H=0.3 cm, S2=0.75cm² is obtained, which makes the diameter of the discharge opening Dd approximately 10 mm.

In the ultrasonic machine 1 of the present embodiment, the ultrasonic horn 26 rotates at a high speed and ultrasonically vibrates in the axial direction thereof, while a narrow clearance is maintained between the machining liquid supply adaptor 28 and the ultrasonic horn 26. Since the machining liquid supply adaptor 28 is not in contact with the ultrasonic horn 26, heating and wear therebetween caused by high speed rotation can be prevented.

Moreover, even though machining liquid is supplied through the openings 45 and 46 provided near the loop of the vibration where the amplitude is largest, efficiency of the piezoelectric transducer 25 is not affected because of the maintained narrow clearance.

The flanges 33 and 34 are provided at nodes of the vibration of the ultrasonic horn 26 to fix the ultrasonic horn 26 on the main shaft 15. Thus, a machining liquid supply unit provided near a node would not be preferable because that would make the structure too complicated. In the present embodiment, however the machining liquid supply unit is provided away from the flanges 33 and 34 to render the structure simple.

Machining liquid is contained inside, not leaking out between the machining liquid supply adaptor 28 and the ultrasonic horn 26 and spattering around the tool 27. This way, the machining point of the work where the tool 27 is applied remains in plain view, hence improving labor effectiveness. Also, a cover for spattering machining liquid can be dispensed with.

While the described embodiment represents the preferred form of the present invention, it is to be understood that changes and variations can be made without departing from the scope and the spirit of the invention.

In the ultrasonic machine of the present invention, the ultrasonic horn is kept out of contact with the fixed side member provided for supplying machining liquid and machining liquid is not allowed to leak out therebetween. Therefore, the ultrasonic machine of the present invention offers the advantages of realizing a high-rotational speed, stable ultrasonic vibration, and clear visibility of the machining point where the tool is applied, hence enhancing labor effectiveness.

Wherefore, having thus described the present invention, what is claimed is:

1. In an ultrasonic machine including an ultrasonic horn connected with a piezoelectric transducer and rotatably supported by a machine body, the ultrasonic horn having a cylindrical portion formed on the outside thereof and a machining liquid passage for supplying machining liquid formed on the inside thereof, a tool mounted on the ultrasonic horn and provided with a bore inside thereof that communicates with the machining liquid passage, the improvement for minimizing undesired splattering and leakage of the machining liquid comprising:
  a) a fixed side member fixed to the machine body and having a machining liquid supply passage that receives a supply of the machining liquid from a machining liquid supply means and an inner surface that rotatably mates with an outer surface of the cylindrical portion;
  b) an annular groove formed in said inner surface of said fixed side member, said annular groove communicating with the machining liquid passage;
  c) a horn communication passage provided in the ultrasonic horn and having an opening in said outer surface of the cylindrical portion of the ultrasonic horn disposed so as to be opposed to said annular groove, said horn communication passage communicating with the machining liquid passage;
  d) a first thin portion provided near said opening and formed by said outer surface of the cylindrical portion and said inner surface of said fixed side member;
  e) a pressure drop chamber provided near said first thin portion and formed between said outer surface of the cylindrical portion and said inner surface of said fixed side member;
  f) a drain provided in said fixed side member and communicating between said pressure drop chamber and an outside drain opening;
  g) a second thin portion provided near said pressure drop chamber and formed by said outer surface of the cylindrical portion and said inner surface of said fixed side member; and,
  h) an air supply passage provided in said fixed side member and communicating with said second thin portion.

2. The improvement to an ultrasonic machine of claim 1 wherein:
  a cross-sectional area of said pressure drop chamber is sufficiently larger than a cross-sectional area of said first thin portion such that upon entering and accumulating in said pressure drop chamber any machining liquid is rapidly decompressed to approximately atmospheric pressure and is momentarily discharged from said drain.

3. The improvement to an ultrasonic machine of claim 2 wherein:
  said outside drain opening is sufficiently large that any machining liquid entering and accumulating in said pressure drop chamber is discharged from said drain without filling up said pressure drop chamber.

4. The improvement to an ultrasonic machine of claim 1 and additionally comprising:
  means for supplying compressed air to said air supply passages sufficient to raise pressure of said air supply passage and adjacent said second thin portion up to a level where said second thin portion functions as an air seal preventing machining liquid under approximately atmospheric pressure in said pressure drop chamber from leaking past said second thin portion.

5. In an ultrasonic machine including an ultrasonic horn driven longitudinally by a piezoelectric transducer and rotatably supported by a machine body wherein the ultrasonic horn has a cylindrical portion formed on a moving end thereof carrying a machine tool and there is a machining liquid passage for supplying machining liquid from outside of the cylindrical portion to a passage on the inside thereof and from there to a bore through the machine tool, sealing apparatus for connecting a pressured supply of machining liquid to the machine tool while minimizing undesired splattering and leakage of the machining liquid comprising:
  a sealing member carried the machine body and having a main bore therethrough concentrically disposed about the cylindrical portion of the horn in close-spaced relationship thereto to allow longitudinal and rotational motion of the cylindrical portion of the horn in said main bore wherein;
  a) said sealing member has a machining liquid supply passage connected on an outer end to a pressured supply of the machining liquid, said machining liquid supply passage having an inner end terminating adjacent an opening to the machining liquid passage in an outer surface of the cylindrical portion;
  b) said sealing member has an indentation formed in an inner surface of said main bore communicating with said inner end of said machining liquid supply passage;
  c) said sealing member has a pair of first thin portions longitudinally disposed on respective sides of said indentation near said opening;
  d) said sealing member has a pressure drop chamber formed therein adjacent said first thin portions, said pressure drop chamber having a drain therein communicating between said pressure drop chamber and an outside drain opening;
  e) said sealing member has a pair of second thin portions longitudinally disposed on respective sides of said pressure drop chamber; and,
  f) said sealing member has an air supply passage connected to a supply of pressurized air and communicating with said main bore on sides of said second thin portions opposite said pressure drop chamber.

6. The sealing apparatus of claim 5 wherein:
  said indentation comprises a first annular groove in said inner surface of said main bore.

7. The sealing apparatus of claim 5 wherein:
  a) said indentation comprises a first annular groove in said inner surface of said main bore; and,
  b) said pair of first thin portions is formed by a pair of second annular grooves in said inner surface of said main bore disposed on opposite sides of said first annular groove.

8. The sealing apparatus of claim 7 wherein:
  a) said indentation comprises a first annular groove in said inner surface of said main bore;
  b) said pair of first thin portions is formed by a pair of second annular grooves in said inner surface of said main bore longitudinally disposed on opposite sides of said first annular groove; and,
  c) said pair of second thin portions is formed by a pair of third annular grooves in said inner surface of said main bore disposed longitudinally opposite respective ones of said second annular grooves from said first annular groove.

9. The sealing apparatus of claim 7 wherein:
said drain includes means for connecting said pair of second annular grooves in said inner surface of said main bore.

10. The sealing apparatus of claim 5 wherein:
a cross-sectional area of said pressure drop chamber is sufficiently larger than a cross-sectional area of said first thin portion such that upon entering and accumulating in said pressure drop chamber any machining liquid is rapidly decompressed to approximately atmospheric pressure and is momentarily discharged from said drain.

11. The sealing apparatus of claim 10 wherein:
said outside drain opening is sufficiently large that any machining liquid entering and accumulating in said pressure drop chamber is discharged from said drain without filling up said pressure drop chamber.

12. The sealing apparatus of claim 5 and additionally comprising:
said supply of pressurized air is of a pressure sufficient to raise pressure of said air supply passage and adjacent said second thin portion up to a level where said second thin portion functions as an air seal preventing machining liquid under approximately atmospheric pressure in said pressure drop chamber from leaking past said second thin portion.

13. In an ultrasonic machine including an ultrasonic horn driven longitudinally by a piezoelectric transducer and rotatably supported by a machine body wherein the ultrasonic horn has a cylindrical portion formed on a moving end thereof carrying a machine tool and there is a machining liquid passage for supplying machining liquid from outside of the cylindrical portion to a passage on the inside thereof and from there to a bore through the machine tool, sealing apparatus for connecting a pressured supply of machining liquid to the machine tool while minimizing undesired splattering and leakage of the machining liquid comprising:
a sealing member carried the machine body and having a main bore therethrough concentrically disposed about the cylindrical portion of the horn in close-spaced relationship thereto to allow longitudinal and rotational motion of the cylindrical portion of the horn in said main bore wherein;
a) said sealing member has a machining liquid supply passage connected on an outer end to a pressured supply of the machining liquid, said machining liquid supply passage having an inner end terminating adjacent an opening to the machining liquid passage in an outer surface of the cylindrical portion;
b) said sealing member has a first annular groove formed in an inner surface of said main bore communicating with said inner end of said machining liquid supply passage;
c) said sealing member has a pair of first thin portions longitudinally disposed on respective sides of said indentation near said opening, said pair of first thin portions being defined by a pair of second annular grooves in said inner surface of said main bore disposed on opposite sides of said first annular groove in close-adjacent spaced relationship thereto, said pair of second annular grooves being interconnected within said sealing member to form a pressure drop chamber adjacent said first thin portions, said pressure drop chamber further having a drain therein communicating between said pressure drop chamber and an outside drain opening;
d) said sealing member has a pair of second thin portions longitudinally disposed on respective sides of said pressure drop chamber, said pair of second thin portions being defined by a pair of third annular grooves in said inner surface of said main bore disposed longitudinally opposite respective ones of said second annular grooves from said first annular groove; and,
e) said sealing member has an air supply passage connected to a supply of pressurized air and communicating with said pair of third annular grooves in said inner surface of said main bore.

14. The sealing apparatus of claim 13 wherein:
a cross-sectional area of said pressure drop chamber is sufficiently larger than a cross-sectional area of said first thin portions such that upon entering and accumulating in said pressure drop chamber any machining liquid is rapidly decompressed to approximately atmospheric pressure and is momentarily discharged from said drain.

15. The sealing apparatus of claim 13 wherein:
said outside drain opening is sufficiently large that any machining liquid entering and accumulating in said pressure drop chamber is discharged from said drain without filling up said pressure drop chamber.

16. The sealing apparatus of claim 13 and additionally comprising:
said supply of compressed air is of a pressure sufficient to raise pressure of said air supply passage and adjacent said second thin portions up to a level where said second thin portions function as air seals preventing machining liquid under approximately atmospheric pressure in said pressure drop chamber from leaking past said second thin portions.

17. In an ultrasonic machine including an ultrasonic horn driven longitudinally by a piezoelectric transducer and rotatably supported by a machine body wherein the ultrasonic horn has a cylindrical portion formed on a moving end thereof carrying a machine tool and there is a machining liquid passage for supplying machining liquid from outside of the cylindrical portion to a passage on the inside thereof and from there to a bore through the machine tool, sealing apparatus for connecting a pressured supply of machining liquid to the machine tool while minimizing undesired splattering and leakage of the machining liquid comprising a sealing member carried the machine body and having a main bore therethrough concentrically disposed about the cylindrical portion of the horn in close-spaced relationship thereto to allow longitudinal and rotational motion of the cylindrical portion of the horn in said main bore, said sealing member comprising:
a) a close-fit connecting portion wherein an inner surface of said main bore is concentrically close-adjacent an outer surface of the cylindrical portion, said close-fit connecting portion including a radial passageway communicating with the machining liquid passage to receive pressured machining liquid therefrom;
b) pressure drop chamber means longitudinally disposed about said close-fit portion on opposite sides thereof for forming a chamber having a drain therein communicating with the atmosphere through which machining liquid entering said pressure drop chamber means can flow out of said sealing member;
c) a pair of close-fit air-seal portions wherein an inner surface of said main bore is concentrically close-adjacent an outer surface of the cylindrical portion longitudinally disposed on opposites sides of said pressure drop chamber means; and,
d) air supply means connected for supplying pressurized air adjacent said pair of close-fit air-seal portions or respective sides thereof opposite from sides adjacent said pressure drop chamber means sufficient to raise pressure adjacent said close-fit air-seal portions up to a level where said close-fit air-seal portions function as air seals preventing machining liquid under approximately atmospheric pressure in said pressure drop chamber means from leaking past said close-fit air-seal portion.

18. The sealing member for an ultrasonic machine of claim 17 and additionally comprising:
a) said sealing member having a machining liquid supply passage connected on an outer end to a pressured supply of the machining liquid, said machining liquid supply passage having an inner end terminating adjacent an opening to the machining liquid passage in an outer surface of the cylindrical portion;
b) said sealing member having a first annular groove formed in an inner surface of said main bore communicating with said inner end of said machining liquid supply passage;
c) said sealing member having a pair of first thin portions longitudinally disposed on respective sides of said indentation near said opening, said pair of first thin portions being defined by a pair of second annular grooves in said inner surface of said main bore disposed on opposite sides of said first annular groove in close-adjacent spaced relationship thereto, said pair of second annular grooves being interconnected within said sealing member to form said pressure drop chamber means adjacent said first thin portions, said pressure drop chamber means further having a drain therein communicating between said pressure drop chamber means and an outside drain opening;
d) said sealing member having a pair of second thin portions longitudinally disposed on respective sides of said pressure drop chamber means, said pair of second thin portions being defined by a pair of third annular grooves in said inner surface of said main bore disposed longitudinally opposite respective ones of said second annular grooves from said first annular groove; and,
e) said sealing member having an air supply passage connected to a supply of pressurized air and communicating with said pair of third annular grooves in said inner surface of said main bore.

19. The sealing member for an ultrasonic machine of claim 18 wherein:
a cross-sectional area of said pressure drop chamber means is sufficiently larger than a cross-sectional area of said first thin portion such that upon entering and accumulating in said pressure drop chamber means any machining liquid is rapidly decompressed to approximately atmospheric pressure and is momentarily discharged from said drain.

20. The sealing member for an ultrasonic machine of claim 19 wherein:
said outside drain opening is sufficiently large that any machining liquid entering and accumulating in said pressure drop chamber means is discharged from said drain without filling up said pressure drop chamber means.

* * * * *